United States Patent [19]

Siligoni et al.

[11] Patent Number: 4,847,896
[45] Date of Patent: Jul. 11, 1989

[54] MONOLITHICALLY INTEGRATABLE TELEPHONE CIRCUIT FOR SUPPLYING RINGING SIGNALS TO A SUBSCRIBER'S TELEPHONE LINE AND FOR DETECTING AN OFF THE HOOK CONDITION DURING RINGING

[75] Inventors: Marco Siligoni, Vittuone; Vanni Saviotti, Monza, both of Italy; Jean-Louis Lavoisard, Joinville-Le-Point, France

[73] Assignees: SGS Microelettronica S.p.A., Cornaredo, Italy; Societe Anonyme De Telecommunications, Paris, France

[21] Appl. No.: 120,311

[22] Filed: Nov. 13, 1987

[30] Foreign Application Priority Data

Nov. 13, 1986 [IT] Italy ................ 22319 A/86

[51] Int. Cl.$^4$ ............................................. H04M 3/02
[52] U.S. Cl. .................................... 379/253; 379/377
[58] Field of Search ............. 379/252, 253, 254, 255, 379/399, 377

[56] References Cited

U.S. PATENT DOCUMENTS

| 3,767,857 | 10/1973 | Colus et al. | 379/255 X |
| 3,978,293 | 8/1976 | Feiner | 379/252 |
| 4,656,659 | 4/1987 | Chea, Jr. | 379/253 |

Primary Examiner—James L. Dwyer
Attorney, Agent, or Firm—Wenderoth, Lind & Ponack

[57] ABSTRACT

A telephone circuit, which may be monolithically integrated, for supplying ringing signals to a subscriber's telephone line and for detecting an off the hook condition during ringing, including a logic control circuit connected to exchange components which control the supply of the ringing signals and determine their rhythm. The logic control circuit is connected to a circuit for detecting direct current on the line and a current comparator for generating a signal when the value of the line current exceeds a predetermined current value. This signal is also supplied to the exchange components via a transfer circuit to inform them that an off the hook condition has taken place. The logic control circuit is connected to a timing signal generator which synchronizes its functions with times in which the ringing signal has a zero amplitude, and is connected to a signal amplifier circuit which supplies the ringing signals to the line and to the transfer circuit. When the circuit for the detection of direct current signals a probable off the hook condition, the logic control circuit disables the amplifier circuit from supplying ringing signals to the line and inhibits the transfer of any signals to the exchange components, and checks after a predetermined time interval that an off the hook condition has actually taken place.

2 Claims, 3 Drawing Sheets

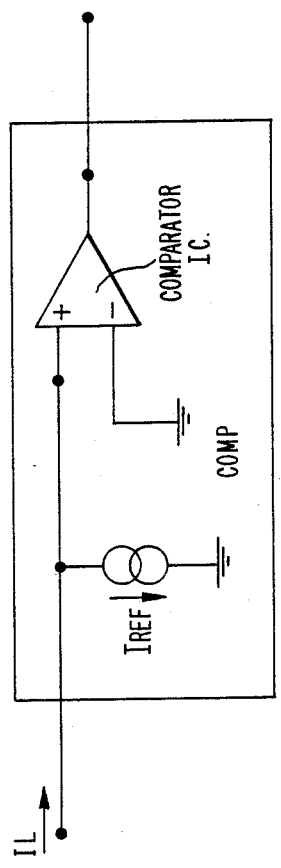
FIG. IA
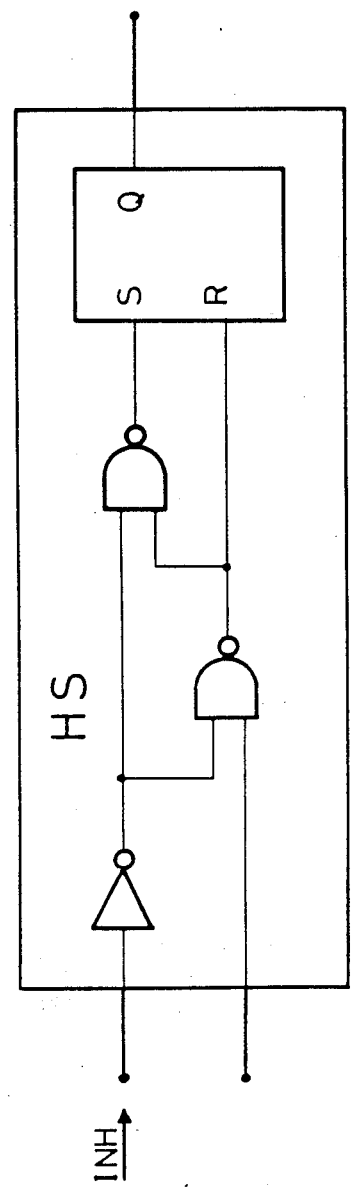
FIG. 2

MONOLITHICALLY INTEGRATABLE TELEPHONE CIRCUIT FOR SUPPLYING RINGING SIGNALS TO A SUBSCRIBER'S TELEPHONE LINE AND FOR DETECTING AN OFF THE HOOK CONDITION DURING RINGING

BACKGROUND OF THE INVENTION

The present invention relates to telephone circuits, which may be monolithically integrated, designed to form an interface between a subscriber's telephone line and exchange control components, and in particular to a telephone circuit for the supplying of ringing signals to a telephone line and the reliable detection of an off the hook condition during ringing.

A subscriber's telephone set is generally connected to a telephone exchange by a two-wire line, to whose terminals both the speech circuit and the ringer of the telephone set itself are respectively connected in parallel.

The speech circuit is connected in series with a switch which is closed only when an off the hook condition takes place, while a capacitor is connected in series with the ringer and is designed to block the direct current component from the line.

A subscriber's telephone line is supplied by a DC voltage generator in series with which there is connected an AC voltage generator which constitutes the source of ringing signals when the exchange components command the supply of these signals to the subscriber.

The exchange control components also determine the ringing rhythm at which the ringing signals are sent to the subscriber's set.

The ringing signals, which have a sinusoidal wave shape and are of a predetermined duration, are supplied to the line in succession spaced by predetermined pauses with no signal.

When an off the hook condition occurs during the supply of a ringing signal, a DC current component is superimposed on the line on the AC ringing current. The AC ringing current is absent both during the pauses between the ringing signals and during the time intervals between one call and the next by the subscriber.

In the modern telephone exchanges, an off the hook condition is detected by a circuit means of an electronic type designed to detect line current variations and to detect the presence of DC current on the line due to an actual off the hook condition, even when the AC current of a possible ringing signal is superimposed thereon.

The sinusoidal ringing signals generally have a frequency of between 16 and 66 Hz and working voltage values which are much higher (60–80 V) than those of normal telephone speech signals and are thus, if they are not immediately discontinued at the time when the phone is taken off the hook, converted by the speech circuit of the subscriber's telephone set into high intensity acoustic signals which may damage the subscriber's hearing and the telephone itself.

A telephone circuit for the detection of an off the hook condition during ringing must therefore have extremely short response times to make it possible to immediately discontinue the supply of ringing signals when an off the hook condition takes place during ringing.

In certain circumstances, however, variations in the line current due to other factors (for example, interference generated by other subscribers) could be interpreted as line current variations following the supply of a DC current component due to an off the hook condition. In order to ensure in all cases that an off the hook condition has been reliably detected, a second check may be carried out, immediately after the discontinuation of the supply of ringing signals, to ascertain whether a DC current is present on the line and to confirm that an off the hook condition by the subscriber has taken place. This solution is disclosed in Italian Pat. Application 30050 A/76 for telephone systems of a conventional type, comprising ringing apparatus with circuits which cannot be monolithically integrated.

It should be noted, however, that the detection of an off the hook condition is not in practice absolutely reliable with this method since any discontinuation of the ringing signals during the transmission of one of these signals may cause an instantaneous voltage and line current variation with the generation of harmonics likely to prevent a reliable check immediately thereafter.

SUMMARY OF THE INVENTION

The object of the present invention is to provide a telephone circuit, which may be monolithically integrated, for supplying ringing signals to a subscriber's telephone line and for detecting an off the hook condition during ringing, and forming an interface between the subscriber's telephone line and exchange control components which does not generate interference on the line and enables an off the hook condition to be detected more rapidly and reliably.

This object may be achieved by providing a monolithically integratable telephone circuit for supplying ringing signals to a subscriber's telephone line and for detecting an off the hook condition during ringing, and forming an interface between a subscriber's telephone line and exchange control components, comprising: a signal amplifier circuit means having at least one input terminal for connection to exchange components for generating a sinusoidal AC signal with a frequency equal to the ringing signal frequency, and having an enabling terminal and first and second output terminals for connection to the subscriber's telephone line; a timing signal generator circuit means having at least one input terminal for connection to the exchange components for generating said sinusoidal AC signal, and for generating a timing signal at each instant of time in which the amplitude of a signal supplied to its input terminal passes through zero during signal variations of the same type; a logic control means having at least a first input terminal for connection to exchange components for generating a control signal for supplying a ringing signal to the line, and a second input terminal connected to an output terminal of a detector circuit means connected to the subscriber's telephone line for detecting a DC current on the line even when an AC current is simultaneously present and for generating a signal when it detects a DC current on the line, and a third input terminal connected to an output terminal of a current comparator means coupled to the subscriber's telephone line for generating a signal when the value of the line current exceeds a predetermined value and a fourth input terminal connected to said timing signal generator circuit and having at least a first output terminal connected to said enabling terminal of the amplifier circuit means and a second output terminal connected to an inhibiting terminal of a transfer circuit means which has an input terminal connected to said output terminal of said current comparator means, and at least one output terminal for connection to exchange components for receiving and processing information signals showing that an off the hook condition has actually taken place.

BRIEF DESCRIPTION OF THE DRAWINGS

The invention is described in greater detail below, purely by way on non-limiting example, with reference to the attached drawings, in which:

FIG. 1A is a block diagram of the comparator COMP.

FIG. 2 is a block diagram of a transfer circuit with a memory included in a telephone circuit in accordance with the present invention;

Figure 1:
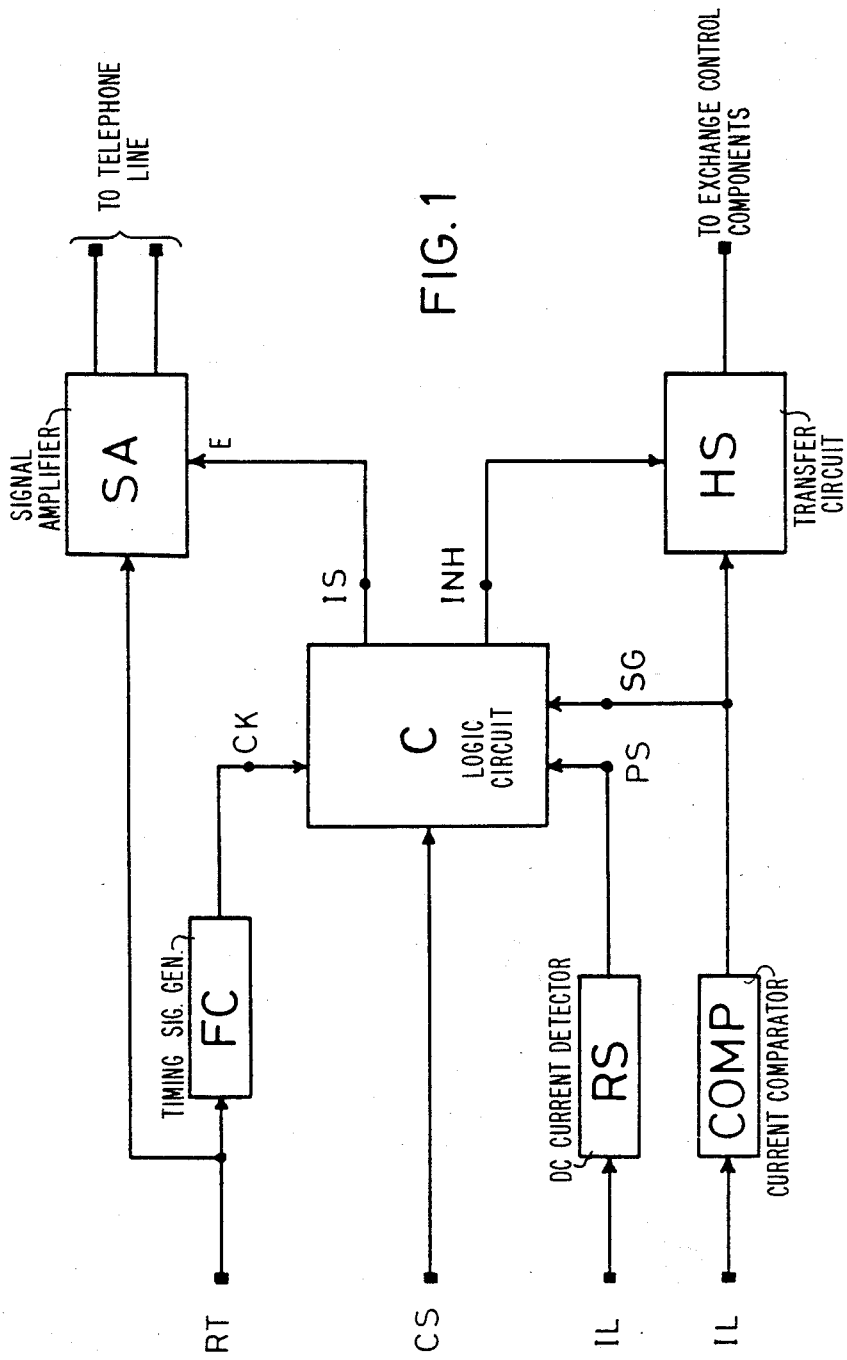
FIG. 1 is a block diagram of a telephone circuit in accordance with the present invention for supplying ringing signals and for detecting an off the hook condition during ringing.

The same letter references have been used in all of the drawing figures for corresponding components.

DESCRIPTION OF THE PREFERRED EMBODIMENT

A telephone circuit in accordance with the present invention, whose block diagram is shown in FIG. 1, comprises a signal amplifier circuit SA, having at least one input terminal RT for connection to exchange components designed to generate a sinusoidal AC signal with a frequency identical to that of the ringing signals to be sent to the line, but having a smaller amplitude. The amplifer SA also has an enabling terminal E and first and second output terminals for connection to a two-wire telephone line (not shown). SGS Microelettronica S.p.A. part No. L 3000 may be used for the amplifier circuit SA.

The exchange components referred to in the description are not shown in FIG. 1.

The telephone circuit of FIG. 1 further comprises a timing signal generator circuit FC, having at least one input terminal connected to the input terminal RT and having at least one output terminal. The timing signal generator circuit FC generates a timing signal at each instant of time in which the amplitude of the sinusoidal signal supplied to the terminal RT passes through zero during signal variations of the same type, i.e. either only when the amplitude of the sinusoidal signal is monotonally increasing or only when the amplitude of the sinusoidal signal is monotonally decreasing. SGS Microelettronica S.p.A. part no. LM 399 may be used for the generator circuit FC.

In FIG. 1, a logic control circuit C has a first terminal CS for connection to exchange components and generates control signals for supplying ringing signals to the line. These signals determine the beginning and end of the subscriber call signal and the ringing rhythm.

A DC current detector circuit RS detects a DC current on the line, even when an AC current is simultaneously present on the line, and generates a signal when it detects A DC current on the line. A current comparator COMP generates a signal when the value of the line current exceeds a predetermined value ($I_{REF}$).

FIG. 1A illustrates such a comparator circuit COMP. The comparator I.C. may be formed of SGS Microelettronica S.p.A. part no. L 339.

Both the detector circuit RS and the current comparator COMP have at least one input terminal IL for connection to the line.

The detector circuit RS has an output terminal connected to a second terminal PS of the logic circuit C, while the comparator COMP has an output circuit connected to both a third terminal SC of the logic circuit C and to an input terminal of a transfer circuit HS also incorporated in the circuit.

The logic control circuit C has a fourth input terminal CK connected to the timing generator circuit FC and may change its logic state only at the time of these signals.

The logic circuit C has a first output terminal IS connected to the enabling terminal E of the signal amplifier circuit SA and a second output terminal INH connected to an inhibiting terminal of the transfer circuit HS.

The transfer circuit Hs has at least one output terminal for connection to exchange control components (not shown) designed to recieve and process signals generated by the transfer circuit with a memory as signals advising that an off the hook condition has actually taken place.

The following is an examination of the operation of a telephone circuit in accordance with the present invention describing possible practical embodiments on the various circuit blocks included in the diagram of FIG. 1.

The signal amplifier circuit SA may be a normal amplifier of a type known to persons skilled in the art which is switched on and off by a control or "enabling" terminal E.

The switching on and off of the amplifier gives rise, from the sinusoidal signal coming from the exchange components, to the ringing signals which are spaced in time and also have a sinusoidal wave shape.

The amplifier circuit SA is in general not directly coupled to the telephone line, but rather via further circuit amplification and supply means of the line.

The timing signal generator circuit FC may be constructed as a circuit known in the technical literature as a "zero crossing detector". When an AC signal is supplied to the input of this known circuiit, it is possible to obtain a pulse signal output each time that the amplitude of the input signals passes through zero or reaches a predetermined threshold, or each time that it passes through zero in a predetermined manner.

In the latter case, if a sinusoidal signal is supplied to the input terminal, the circuit generates pulse output signals with a frequency equal to the frequency of the sinusoidal input signal.

In a telephone circuit in accordance with the present invention, these pulse signals act a timing signals to synchronize all of the functions of the circuit exactly with points in time in which the amplitude of the ringing signals to be supplied to the line pass through zero.

The detector circuit RS may take the form, using known solutions, of a line current transducer and integrator circuit which integrates the current supplied by the transducer over one or more whole periods of the line voltage.

A solution of this type is disclosed, for example, in Italian Patent Application 23832 A/83, and the corresponding English language European cognate Patent Application No. 0143435 A².

When the integrator detects the presence on the line of a DC current having a value greater than a predetermined value, an information signal, showing that there is a DC current on the line and therefore that an off the hook condition may have taken place, is generated. This information signal supplied by the detector circuit RS is processed, however, by the logic control circuit C in such a way that the exchange components cannot be erroneously advised of an off the hook condition which has not, in fact, taken place.

The logic circuit C is connected for this purpose to the current comparator COMP, of a type known to those skilled in the art, which generates an information signal when the instantaneous value of the line current exceeds a predetermined value. This signal, which is taken by the logic circuit C as advice that an off the hook condition has taken place, is also transmitted to the exchange components via the transfer circuit HS which is driven, via its inhibiting terminal, by the logic circuit C such that the signal generated by the current comparator COMP is transmitted only when the information that an off the hook condition has taken place is certain.

The transfer circuit HS may simply be an electronic switch which prevents the transfer of the signal generated by the comparator when a signal generated by the logic circuit C is supplied to the inhibiting terminal. For particular design reasons, it may, however, take the form of the more complex circuit comprising a memory component shown in FIG. 2.

In this case, the transfer circuit HS is designed, when no signal is being supplied to the inhibiting terminal, to transfer as output the signals supplied to the input terminal and is, in contrast, designed to store, at the instant in which a signal is supplied to the inhibiting terminal, the presence or absence of an input signal, generating, when a signal is supplied in this instant to the input terminal, an output signal until the signal supplied to the inhibiting terminal is discontinued.

The main component of a telephone circuit of the invention is the logic control circuit C, whose operating stages are fully synchronized with the instants of time in which the ringing signal has a zero amplitude by the timing signals supplied to the input terminal CK.

The logic control circuit C comprises circuit means designed to generate, via the output terminal IS, a signal enabling the signal amplifier circuit SA to supply ringing signals to the line when a control signal from the exchange is supplied to the control terminal CS, starting to generate this signal, however, only after a predetermined number of timing signals from the instant of time in which the control signal is supplied and continuing to generate the signal, if no off the hook condition (whether actual or assumed) is detected, up to the instant of time in which the first timing signal following the cessation of the control signal is supplied to the terminal CK.

This avoids uncertainties as regards the control signal from the exchange and avoids, as mentioned above, the generation of interference on the line.

These circuit means included in the logic control circuit C are also designed to generate, via the output terminal INH, from the same instant of time as that in which the enabling signal begins to be generated via the output terminal IS, a signal inhibiting the transfer circuit HS from transmitting any signals to the exchange control components.

This inhibiting signal continues to be generated, when an off the hook condition has not been confirmed, up to the instant of time in which a predetermined timing signal, following the cessation of the control signal supplied to the terminal CS, is supplied to the terminal CK.

This predetermined timing signal in not in general the first timing signal after the cessation of the control signal, but a subsequent signal, selected such that before transmission of an information signal advising that an off the hook condition has taken place to the exchange components, there is time for the confirmation of an off the hook condition by the logic control circuit C and such that this transmission takes place when the telephone network is stabilized after the supply of ringing signals to the line has been discontinued.

The logic control circuit C also comprises a first and a second timed control circuit which make it possible to interrupt or prevent the generation of signals via the output terminals IS and INH.

The first timed control circuit is designed to detect any signal of an assumed off the hook condition supplied to the input terminal PS only in those instants in time in which a control signal is being supplied to the input terminal CS and a timing signal is simultaneously being supplied to the input terminal CK, with the exception of a predetermined number of such instants of time after each occasion in which the first timed control circuit detects the supply of a signal to the input terminal PS.

When it detects the supply of a signal to the terminal PS, the first timed control circuit inhibits the generation, via the output terminal IS, of the enabling signal until a predetermined timing signal is subsequently supplied to the input terminal CK.

In this way the logic control circuit C, during the calls stage, as soon as it receives advice from the circuit means RS of a possible off the hook condition, discontinues for a predetermined period, needed for the subsequent confirmation of an actual off the hook condition, the supply of ringing signals to the line. If an off the hook condition has not in fact taken place, the supply of ringing signals may be restarted if, obviously, a control signal is still being supplied to the input terminal CS.

The operation to check whether an off the hook condition has actually taken place is essentially carried out by the second timed control circuit, which detects, via the terminal SG, a possible signal generated by the current comparator COMP only when the input terminal CK is being supplied with that predetermined timing signal which also enables the generation of the enabling signal to be continued via the output terminal IS, after every interruption thereof, and when, at the same time, a control signal is being supplied to the input terminal CS.

In this way the possible signal from the comparator COMP may be detected in an instant of time in which the network is stabilized and there is still not AC current on the line, starting to supply ringing signals to the line only at that instant of time, since this possible signal is undoubtedly a confirmation of a DC current on the line due to an actual off the hook condition.

When the second timed control circuit detects the supply of a confirmation signal to the terminal SG, it disables the first timed control circuit from detecting the supplying of signals to the input terminal PS and inhibits the generation of signals via the two output terminals IS and INH until the first timing signal following the cessation of the supply of the control signal from the exchange components to the input terminal CS is supplied to the input terminal CK. As soon as the generation of the inhibiting signal via the terminal INH is discontinued, the transfer circuit HS enables the transmission of the signal generated by the current comparator COMP to the exchange components as advice that an off the hook condition has taken place and this interrupts the control signal being supplied to the first input terminal CS of the logic control circuit C which, as is clearly shown form the mode of operation described below, returns to an initial state in which it waits for further control signals from the exchange. It should be noted that there is no difference between a discontinuation of the control signal designed to determine the ringing rhythm and a discontinuation due to the cessation of the call phase.

A relatively simple circuit embodiment of the logic control circuit C is immediately suggested to persons skilled in the art on the basis of the characteristics described above with respect to the circuit means which generates the output signals and the first and the second timed control circuits.

These may be constructed directly in a known manner, or, obviously to the person skilled in the art, using AND gates, D type flip-flops and timing pulse signal counters.

It is important to note, however, that the logic control circuit C may be constructed as a logic state machine designed to carry out a number of functions, not just those listed, comprising an assembly of constituent logic components from which is would not be possible to pick out, unequivocally in time, circuit means for generating signals and timed control circuits, even though it would be possible to pick out, at each instant of time, the various logic components designed to form them in practice.

Only the fact that the logic circuit always comprises these circuit means and timed control circuits is a feature of the present invention.

Figure 3:
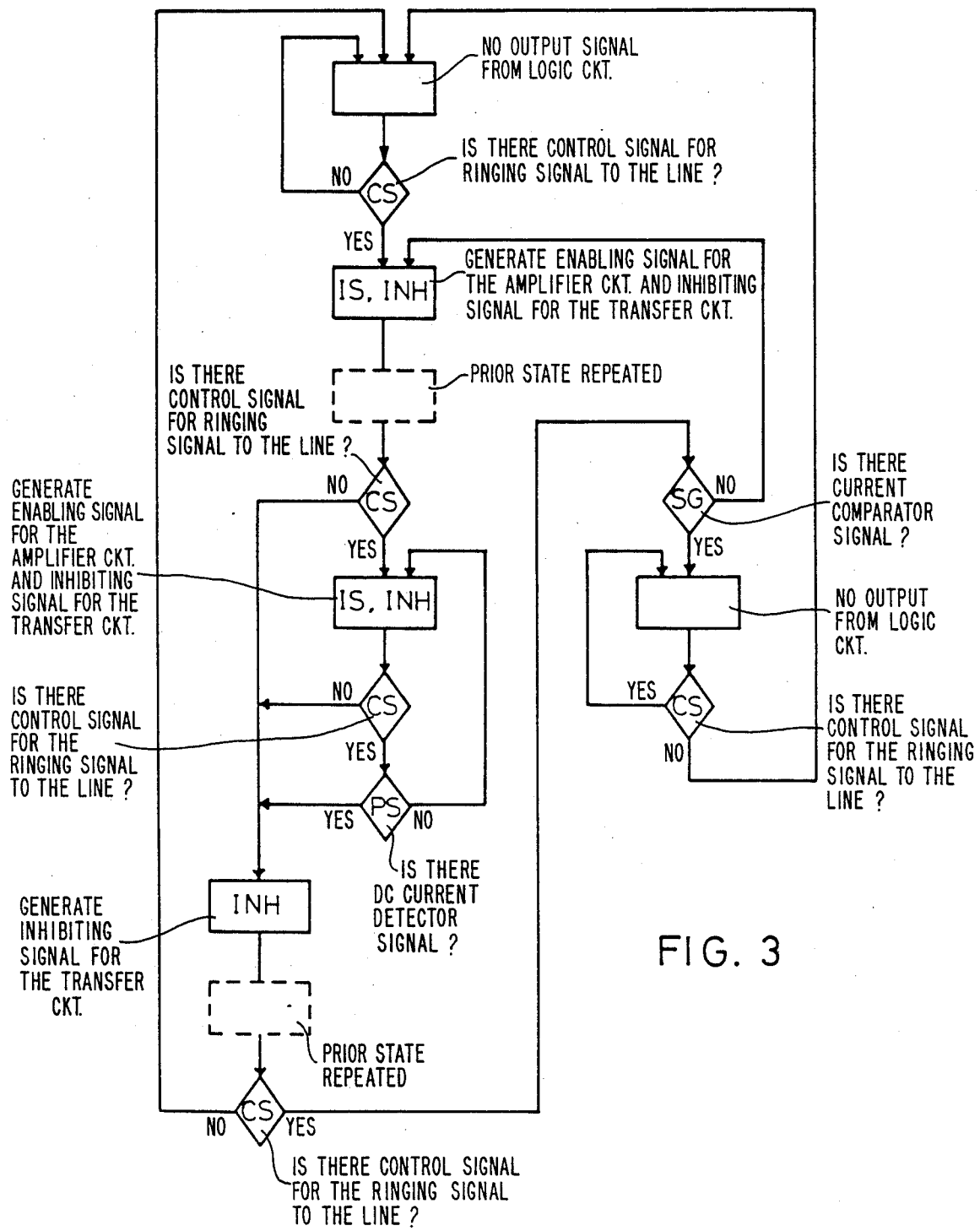
FIG. 3 is a flow chart designed to show in symbolic form the possible evolution over time of the logic states of a logic control circuit included in a telephone circuit in accordance with the present invention.

FIG. 3 thus shows a flow chart illustrating the evolution over time of the logic states of a logic state machine designed to form the logic control circuit C.

A person skilled in the art could construct the circuit of the logic state machine directly from this flow chart using the circuit components which he has available.

The form of the illustration of FIG. 3 is of a conventionally known type. Each rectangle, which represents a logic state, shows the state of the outputs of the logic control circuit C, indicating the symbol of the output terminal(s) via which a signal is being generated.

Each diamond, which represents a decision function of the logic circuit, shows the symbol of the input terminal to which a signal is being supplied causing the subsequent passage, shown by an arrow, to another logic state. The letter Y indicates the passage caused by the supply of a signal to this terminal, while the letter N indicates the passage which takes place if no signal is being supplied.

Passage from one logic state to the next takes place at each timing signal supplied to the input terminal CK.

The rectangles is dashed lines represent the possibility of one or more repetitions of the prior state shown by a rectangle in continuous lines.

It is evident that telephone circuit in accordance with the present invention not only makes it possible to prevent interference on the line and to obtain at the same time reliable detection of an off the hook condition actually taking place, but also allows its integration in more complex interface circuits whose completely separate functions may be carried out by the same logic circuit.

Although a single embodiment of the invention has been described and illustrated it is evident that many variants are possible without departing from the scope of the invention.

We claim:

1. A monolithically integratable telephone circuit for supplying ringing signals to a subscriber's telephone line and for detecting an off the hook condition during ringing, and forming an interface between a subscriber's telephone line and exchange control components, comprising: a signal amplifier circuit means having at least one input terminal for connection to exchange components for generating a sinusoidal AC signal with a frequency equal to the ringing signal frequency, and having an enabling terminal and first and second output terminals for connection to the subscriber's telephone line; a timing signal generator circuit means having at least one input terminal for connection to the exchange components for generating said sinusoidal AC signal, and for generating a timing signal at each instant of time in which the amplitude of a signal supplied to its input terminal passes through zero during signal variations of the same type; a logic control means having at least a first input terminal for connection to exchange components for generating a control signal for supplying a ringing signal to the line, and a second input terminal connected to an output terminal of a detector circuit means connected to the subscriber's telephone line for detecting a DC current on the line even when an AC current is simultaneously present and for generating a signal when it detects a DC current on the line, and a third input terminal connected to an output terminal of a current comparator means coupled to the subscriber's telephone line for generating a signal when the value of the line current exceeds a predetermined value and a fourth input terminal connected to said timing signal generator circuit and having at least a first output terminal connected to said enabling terminal of the amplifier circuit means and a second output terminal connected to an inhibiting terminal of a transfer circuit means which has an input terminal connected to said output terminal of said current comparator means, and at least one output terminal for connection to exchange components for receiving and processing information signals showing that an off the hook condition has actually taken place; wherein said transfer circuit means comprises a memory means which enables it, when no signal is being supplied to its inhibiting terminal, to transfer via its output terminal a signal supplied to its input terminal and, in contrast to store, in the instant of time in which a signal is supplied to its inhibiting terminal, the presence or absence of signals at its input terminal, generating a signal via its output terminal, until the supply of the signal to its inhibiting terminal is discontinued, only when a signal is supplied to the input terminal in said instant of time in which a signal is supplied to its inhibiting terminal.

2. A monolithically integratable telephone circuit for supplying ringing signals to a subscriber's telephone line and for detecting an off the hook condition during ringing, and forming an interface between a subscriber's telephone line and exchange control components, comprising: a signal amplifier circuit means having at least one input terminal for connection to exchange components for generating a sinusoidal AC signal with a frequency equal to the ringing signal frequency, and having an enabling terminal and first and second output terminals for connection to the subscriber's telephone line; a timing signal generator circuit means having at least one input terminal for connection to the exchange components for generating said sinusoidal AC signal, and for generating a timing signal at each instant of time in which the amplitude of a signal supplied to its input terminal passes through zero during signal variations of the same type; a logic control means having at least a first input terminal for connection to exchange components for generating a control signal for supplying a ringing signal to the line, and a second input terminal connected to an output terminal of a detector circuit means connected to the subscriber's telephone line for detecting a DC current on the line even when an AC current is simultaneously present and for generating a signal when it detects a DC current on the line, and a third input terminal connected to an output terminal of a current comparator means coupled to the subscriber's telephone line for generating a signal when the value of the line current exceeds a predetermined value and a fourth input terminal connected to said timing signal generator circuit and having at least a first output terminal connected to said enabling terminal of the amplifier circuit means and a second output terminal connected to an inhibiting terminal of a transfer circuit means which has an input terminal connected to said output terminal of said current comparator means, and at least one output terminal for connection to exchange components for receiving and processing information signals showing that an off the hook condition has actually taken place; wherein said logic control means comprises: a means for generating a signal via its first output terminal during an entire time interval between the supplying to said fourth input terminal of an initial predetermined timing signal following the supply of a signal to said first input terminal, and the supplying to said fourth input terminal of said first timing signal after the cessation of said signal supplied to said first input terminal and for generating a signal via its second output terminal during an entire time interval between the supplying to said fourth input terminal of an initial predetermined timing signal following the supply of a signal to said first input terminal, and the supplying to said fourth input terminal of a predetermined timing signal following the cessation of said signal supplied to said first input terminal; a first timed control means for detecting the supplying of a signal to said second input terminal only in those instants of time in which a signal is being supplied to said first input terminal and a timing signal is simultaneously being supplied to said fourth input terminal, with the exception of a predetermined number of these instants of time following each instant of time in which it detects the supplying of a signal to said second input terminal and, when it detects the supplying of a signal to said second input terminal, for inhibiting the generation of a signal via its first output terminal until such time that a subsequent predetermined final timing signal is supplied to said fourth input terminal; a second timed control means for detecting the supplying of a signal to said third input terminal only when said fourth input terminal is being supplied with said predetermined final timing signal following each instant of time in which said first timed control means detects the supplying of a signal to said second input terminal and a signal is simultaneously being supplied to said first input terminal and, when it detects the supplying of a signal to said third input terminal, for disabling said first timed control circuit from detecting the supplying of a signal to said second input terminal and for inhibiting the generation of signals via its first and second output terminals until said fourth input terminal is supplied with said first timing signal following the cessation of said signal supplied to said first input terminal.

* * * * *